United States Patent
Subramanian et al.

(10) Patent No.: US 9,034,472 B2
(45) Date of Patent: May 19, 2015

(54) NON-AQUEOUS POLYURETHANE COATING COMPOSITIONS

(75) Inventors: Ramesh Subramanian, Louisville, KY (US); Abdullah Ekin, Coraopolis, PA (US); Carol Kinney, Eighty Four, PA (US); Christine Mebane, Braddock, PA (US); Wolfgang Fischer, Meerbusch (DE); Helmut Kuczewski, Kamp-Lintfort (DE)

(73) Assignee: ALLNEX IP S.a.r.l., Luxembourg (LU)

( * ) Notice: Subject to any disclaimer, the term of this patent is extended or adjusted under 35 U.S.C. 154(b) by 0 days.

(21) Appl. No.: 13/980,104

(22) PCT Filed: Jan. 19, 2012

(86) PCT No.: PCT/US2012/021832
§ 371 (c)(1),
(2), (4) Date: Sep. 27, 2013

(87) PCT Pub. No.: WO2012/100024
PCT Pub. Date: Jul. 26, 2012

(65) Prior Publication Data
US 2014/0037874 A1 Feb. 6, 2014

Related U.S. Application Data

(60) Provisional application No. 61/434,575, filed on Jan. 20, 2011.

(51) Int. Cl.
| | |
|---|---|
| B32B 27/00 | (2006.01) |
| B32B 27/40 | (2006.01) |
| C03C 17/32 | (2006.01) |
| C03C 17/00 | (2006.01) |
| C09D 4/06 | (2006.01) |
| C08G 18/67 | (2006.01) |

(52) U.S. Cl.
CPC .......... *C03C 17/322* (2013.01); *Y10T 428/1321* (2015.01); *C03C 17/005* (2013.01); *C09D 4/06* (2013.01); *C08G 18/672* (2013.01)

(58) Field of Classification Search
USPC .......... 428/34.7, 425.6; 106/287.25; 427/487, 427/520, 507
See application file for complete search history.

(56) References Cited

U.S. PATENT DOCUMENTS

| | | | |
|---|---|---|---|
| 3,124,605 | A | 3/1964 | Wagner |
| 3,183,112 | A | 5/1965 | Gemassmer |
| 3,640,967 | A | 2/1972 | Konig et al. |
| 3,919,218 | A | 11/1975 | Schmitt et al. |
| 4,108,814 | A | 8/1978 | Reiff et al. |
| 4,324,879 | A | 4/1982 | Bock et al. |
| 4,380,604 | A | 4/1983 | Neuhaus et al. |
| 4,808,691 | A | 2/1989 | Konig et al. |
| 5,739,251 | A | 4/1998 | Venham et al. |
| 5,767,220 | A | 6/1998 | Venham et al. |
| 5,914,383 | A | 6/1999 | Richter et al. |
| 5,951,911 | A | 9/1999 | Venham et al. |
| 6,753,394 | B2 | 6/2004 | Weikard et al. |
| 2006/0052527 | A1 | 3/2006 | Weikard et al. |
| 2006/0079660 | A1 | 4/2006 | Ludewig et al. |
| 2006/0128923 | A1 | 6/2006 | Roesler et al. |
| 2006/0205911 | A1 | 9/2006 | Ludewig et al. |
| 2007/0191570 | A1 | 8/2007 | Weikard et al. |
| 2007/0232751 | A1 | 10/2007 | Ludewig et al. |

FOREIGN PATENT DOCUMENTS

| | | |
|---|---|---|
| CA | 2253119 | 5/1999 |
| DE | 1570540 | 3/1970 |

OTHER PUBLICATIONS

Ullmanns Encyclopadie der Technischen Chemie, 4th edition, vol. 19, Verlag Chemie, Weinheim pp. 31-38.
P. K. T. Oldring (Ed.), Chemistry & Technology of UV & EB Formulations For Coatings, Inks & Paints, vol. 2, 1991, SITA Technology, London, pp. 237-285.

*Primary Examiner* — Michael C Miggins
(74) *Attorney, Agent, or Firm* — Drinker Biddle & Reath LLP

(57) ABSTRACT

The present invention relates to a non-aqueous coating composition comprising:
1) 75 to 99 wt. %, preferably 85 to 95 wt. % of a hard urethane(meth)acrylate polymer or oligomer; and
2) 1 to 25 wt. %, preferably 5 to 15 wt. % of a soft unsaturated urethane(meth)acrylate polymer or oligomer containing allophanate groups.

18 Claims, No Drawings

NON-AQUEOUS POLYURETHANE COATING COMPOSITIONS

BACKGROUND OF THE INVENTION

The present invention relates to non-aqueous polyurethane coating compositions and particularly to their use for coating glass substrates.

Glass surfaces may be provided with a coating for decorative or safety reasons (anti-shattering). However, in addition to the anti-shattering effect, other severe requirements may have to be fulfilled, such as abrasion resistance, scratch resistance, mar resistance, elasticity, water resistance, detergent resistance and alkali resistance.

In the case of glass containers, clear and/or colored coatings should give protection to the surface to help minimize mechanical damage, such as scuffing and chipping, to the container during filling operations and transport.

Coating a glass container in a high speed production environment can be challenging. The coating has to be applied and cured at very high line speeds. Ultraviolet (UV) radiation curable coating technology is a solution for such high speed applications. In order to achieve high speed line requirements, the UV curable coating needs to flow and level well on the substrate, then cure rapidly on exposure to UV radiation.

An object of the present invention is to provide coating compositions, which are suitable for various surfaces including glass and have, in addition to outstanding optical properties, good adhesion, increased abrasion resistance, elasticity, toughness, water resistance, detergent resistance and alkali resistance.

This object may be obtained with the coating compositions according to the invention, which are described below in greater detail.

SUMMARY OF HE INVENTION

The present invention relates to a non-aqueous coating composition comprising:
1) 75 to 99 wt. %, preferably 85 to 95 wt. % of a hard unsaturated urethane(meth)acrylate polymer or oligomer;
2) 1 to 25 wt. %, preferably 5 to 15 wt. % of a soft unsaturated urethane(meth)acrylate polymer or oligomer containing allophanate groups;

wherein the total wt. % of components 1) and 2) add up to 100%.

DETAILED DESCRIPTION OF THE PREFERRED EMBODIMENTS

As used herein and in the following claims, "hard unsaturated urethane(meth)acrylate polymer or oligomer" shall mean an unsaturated (meth)acrylate polymer or oligomer which, when cured by UV radiation, exhibits a microhardness as measured by DIN 14577 of $\geq 50$ N/mm$^2$.

As used herein and in the following claims, "soft unsaturated urethane(meth)acrylate polymer or oligomer containing allophanate groups" shall mean an unsaturated urethane (meth)acrylate polymer or oligomer containing allophanate groups which, when cured by UV radiation, exhibits a microhardness as measured by DIN 14577 of <50 N/mm$^2$.

As used herein and in the following claims "(meth)acrylate" shall mean acrylate and/or methacrylate.

As used herein and in the following claims, "unsaturated urethane(meth)acrylate polymer or oligomer" shall mean a polymer or oligomer having urethane groups and (meth)acrylate groups.

As used herein and in the following claims, "hard urethane acrylate" shall mean a hard unsaturated urethane(meth)acrylate polymer or oligomer as defined above.

As used herein and in the following claims, "soft allophanate urethane acrylate" shall mean a soft unsaturated urethane (meth)acrylate polymer or oligomer containing allophanate groups as defined above.

As used herein and in the following claims, "molecular weight" or "MW" shall mean number average molecular weight.

Unless otherwise specified herein, all percentages shall be understood as weight percent on a solids basis.

Component 1) of the coating composition of the present invention is a hard unsaturated urethane(meth)acrylate polymer or oligomer. Hard urethane acrylates are known to those skilled in the art. Useful hard urethane(meth)acrylates are described in U.S. Pat. Nos. 4,380,604 and 6,753,394, the entire disclosures of which are herein incorporated by reference.

In one embodiment, component 1) is a hard unsaturated (meth)acrylate polymer or oligomer prepared by reacting
 i) one or more organic polyisocyanates, and
 ii) one or more —NH or —OH functional compounds having a number average molecular weight of from about 60 to about 600, and
 iii) 1) from 0 to about 100% by weight, preferably from about 10 to about 90% by weight, and most preferably from about 25 to about 75% by weight, of a mono-, di-, tri- or poly-hydroxyl-$C_1$-$C_{10}$-alkyl or $C_6$-$C_{10}$-aryl (meth)acrylate,
   2) from 0 to 100% by weight of an unsaturated (meth) acrylate polyol based on polyesters, polyethers, polythioethers, polyacetals, polycarbonates, dimer fatty alcohols and/or esteramides that are customary in polyurethane chemistry, in each case with number average molecular weights of 400 to 8 000 g/mol. Preferred unsaturated (meth)acrylate polyols are polyethers, polyesters and polycarbonates based having an OH number of from about 30 to about 500 (preferably from about 100 to about 400 and most preferably from about 100 to about 300), and prepared by reacting a polyether or polyester or polycarbonate di- or polyol with acrylic and/or methacrylic acid, and
   3) or the combination of iii) 1) and ii) 2) wherein the percents by weight of components iii) 1), iii) 2) are based on the total weight of components iii) 1) and iii) 2) and total 100%,
at an isocyanate to hydroxyl equivalent ratio of from about 0.9:1 to about 1:0.9 (and preferably about 1:1).

Suitable polyisocyanates include organic polyisocyanates having aliphatically, cycloaliphatically and/or aromatically bound isocyanate groups and generally having molecular weights of from about 144 to about 1000, more preferably from about 168 to about 300. Suitable examples include butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate(2,2,4 and/or 2,4,4-trimethyl-hexamethylene diisocyanate), the isomeric bis(4,4'-isocyanato-cyclohexyl) methanes ($H_{12}$MDI), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919,218, and 4,324,879 and in EP 798 299.

Preferably used are HDI, IPDI, TDI, $H_{12}$MDI and/or isocyanurate group-containing polyisocyanates obtained by trimerization of HDI, TDI or IPDI. Particularly preferred are HDI and IPDI and mixtures thereof.

The —NH and —OH functional compounds useful herein as component ii) have number average molecular weights of from about 60 to about 600 and preferably from about 60 to about 200. Specifically useful —OH functional compounds include ethylene glycol; diethylene glycol; triethylene glycol; propylene glycol; dipropylene glycol; butane diols; hexane diols; glycerin; trimethylolethane; trimethylolpropane; pentaerythritol; hexane triols; mannitol; sorbitol; glucose; fructose; mannose; sucrose; and propoxylated and/or ethoxylated adducts of any of the above-noted hydroxy functional materials having number average molecular weights of up to about 600.

Suitable —NH functional compounds include, for example, ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dimethyl-4,4'-diamino-dicyclohexyl methane. Aromatic polyamines such as 2,4- and/or 2,6-diaminotoluene and 2,4'- and/or 4,4'-diaminodiphenyl methane are also suitable but less preferred. Relatively high molecular weight polyether polyamines containing aliphatically bound primary amino groups, for example, the products marketed under the Jeffamine trademark by Air Products, are also suitable.

In preparing the unsaturated urethane(meth)acrylate, the polyisocyanate is reacted at an isocyanate to OH equivalent ratio of from 0.5:1 to 1:0.5, preferably about 0.9:1 to about 1:0.9, and more preferably about 1:1, with 1) an unsaturated polyether(meth)acrylate having an OH number of from about 30 to about 300 or an unsaturated polyester(meth)acrylate, having an OH number of from about 30 to about 300, 2) a mono-, di-, tri-, or polyhydroxyl $C_1$ to $C_{10}$-alkyl or $C_6$ to $C_{10}$-aryl(meth)acrylate, or 3) a mixture thereof.

Useful unsaturated polyether(meth)acrylates are prepared by reacting a polyether polyol (having a hydroxyl functionality of from 2 to 6) with acrylic and/or methacrylic acid. Suitable polyether polyols are of the type known in the polyurethane art and are generally prepared by reacting a suitable staring molecule such as, e.g., ethylene glycol, propylene glycol, butanol, glycerol, trimethylol propane, hexane diol, pentaerythritol and the like with ethylene oxide, propylene oxide or a mixture thereof. The polyether is then reacted with acrylic and/or methacrylic acid. When the unsaturated polyether(meth)acrylate is to be used to prepare the unsaturated urethane(meth)acrylate, the polyether is selected so as to produce the (meth)acrylate having the required OH number and the components are reacted in amounts such that the resultant unsaturated polyether(meth)acrylate has an OH number of from about 30 to about 500, preferably from about 100 to about 400 and most preferably from about 100 to about 300. In the case where the unsaturated (meth)acrylate is to be used as an part or all of component iii), the polyether is selected so as to produce the (meth)acrylate having the required OH number and the polyether and acrylic (and/or methacrylic) acid are reacted in amounts such that the resultant unsaturated polyether(meth)acrylate has an OH number of from about 30 to about 500, preferably from about 100 to about 400 and most preferably from about 100 to about 300.

Useful unsaturated polyester(meth)acrylates are prepared by reacting a polyester polyol (having a hydroxyl functionality of from 2 to 6) with acrylic and/or methacrylic acid. Suitable polyester polyols are of the type known in the polyurethane art and are generally prepared by reacting a suitable staring glycols such as, e.g., ethylene glycol, propylene glycol, butanol, glycerol, trimethylol propane, hexane diol, pentaerythritol and the like with diacids or anhydrides (such as adipic, fumaric, maleic, terephthalic, isophthalic, phtalic and the like, or a mixture thereof. The polyester polyol is then reacted with acrylic and/or methacrylic acid. When the unsaturated polyester(meth)acrylate is to be used to prepare the unsaturated urethane(meth)acrylate, the polyester is selected so as to produce the (meth)acrylate having the required OH number and the components are reacted in amounts such that the resultant unsaturated polyester(meth)acrylate has an OH number of from about 30 to about 500, preferably from about 100 to about 400 and most preferably from about 100 to about 300. In the case where the unsaturated (meth)acrylate is to be used as an part or all of component iii), the polyester is selected so as to produce the (meth)acrylate having the required OH number and the polyester and acrylic (and/or methacrylic) acid are reacted in amounts such that the resultant unsaturated polyester(meth)acrylate has an OH number of from about 30 to about 500, preferably from about 100 to about 400 and most preferably from about 100 to about 300.

Useful mono-, di-, tri-, or polyhydroxyl $C_1$ to $C_{10}$-alkyl or $C_6$ to $C_{10}$-aryl(meth)acrylates are also known in the polyurethane art. Such material are prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples include hydroxyethyl acrylate, hydroxypropyl acrylate, hydroxybutyl acrylate, hydroxypropyl acrylate, hydroxyhexyl acrylate, triglycerol diacrylate, dipentaerythritol pentaacrylate, and the corresponding methacrylates.

Component 2) of the coating composition of the present invention is a soft allophanate unsaturated urethane(meth) acrylate polymer or oligomer. Soft allophanate urethane acrylates are known to those skilled in the art. Suitable soft allophanate urethane acrylates, methods of their preparation, and components thereof are described in U.S. Patent Application Publication Nos. 2006/0052527, 2006/0079660, 2007/0191570, 2006/0205911, 2006/0128923 and 2007/0232751, and U.S. Pat. Nos. 5,951,911, 5,767,220 and 5,739,251, the entire contents of each of which are incorporated herein by reference.

In one preferred embodiment, the soft allophanate unsaturated urethane(meth)acrylate polymer or oligomer has a residual monomer content of less than 0.5% by weight and an NCO content of less than 1% by weight, and is prepared by reacting A) compounds containing isocyanate groups, B) hydroxy-functional compounds which contain groups which react, with polymerization, with ethylenically unsaturated compounds on exposure to actinic radiation (radiation-curing groups) and C) optionally further compounds containing NCO-reactive groups D) optionally in the presence of a catalyst are used to form NCO-group-containing urethanes having radiation-curing groups, which are subsequently reacted, without further addition of compounds containing isocyanate groups, in the presence E) of an allophanatization catalyst, the ratio of NCO groups of the compounds from A) to the OH groups of the compounds from B) and, where used, C) being 1.45:1.0 to 1.1:1.0.

The ratio of NCO groups of the compounds from A) to the OH groups of the compounds from B) and, where used, C) is preferably 1.43:1.0 to 1.2:1.0, more preferably 1.35:1.0 to 1.3:1.0.

Suitable isocyanate-containing compounds A) include aromatic, aliphatic and cycloaliphatic polyisocyanates. Suitable polyisocyanates are compounds of the formula $Q(NCO)_n$ having a number-average molecular weight below 800 g/mol, in which n is a number from 2 to 4 and Q is an aromatic $C_6$-$C_{15}$ hydrocarbon radical, an aliphatic $C_4$-$C_{12}$ hydrocarbon radical or a cycloaliphatic $C_6$-$C_{15}$ hydrocarbon radical. Suitability is possessed for example by diisocyanates from the series consisting of 2,4-/2,6-toluene diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate(isophorone diisocyanate=IPDI), tetramethylene diisocyanate, hexamethylene diisocyanate (HDI), 2-methyl-pentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclohexyl)propane, 3-isocyanatomethyl-1-methyl-1-isocyanato-cyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI) and also mixtures consisting of these compounds.

Likewise suitable as isocyanate-containing compounds A) are reaction products of the aforementioned isocyanates with themselves or with one another to form uretdiones or isocyanurates. Mention may be made by way of example of Desmodur® N3300, Desmodur® N3400 or Desmodur® N3600 (all Bayer MaterialScience, Leverkusen, Del.).

Also suitable as isocyanate-containing compounds A) are reaction products of the aforementioned isocyanates with other isocyanate-reactive compounds to form prepolymers. Such isocyanate-reactive compounds are, in particular, polyols, such as polyether polyols, polyester polyols, polycarbonate polyols and polyhydric alcohols, for example. As polyols it is possible to use hydroxyl compounds of relatively high molecular weight and, in minor amounts, hydroxyl compounds of low molecular weight as well.

The compounds of component A) can accordingly be inserted directly into the process or, starting from an arbitrary precursor, can be prepared by preliminary reaction before the process of the invention is carried out.

Preference is given as component A) to the use of monomeric diisocyanates. Very particular preference is given to using hexamethylene diisocyanate (HDI), isophorone diisocyanate (IPDI) and/or 4,4'-diisocyanatodicyclohexylmethane.

By actinic radiation is meant electromagnetic, ionizing radiation, especially electron beams, UV radiation and also visible light (Roche Lexikon Medizin, 4th edition; Urban & Fischer Verlag, Munich 1999).

Groups which react, with polymerization, with ethylenically unsaturated compounds on exposure to actinic radiation (radiation-curing groups) are for the purposes of the present invention vinyl ether, maleyl, fumaryl, maleimide, dicyclopentadienyl, acrylamide, acrylic and methacrylic groups, preference being given to vinyl ether, acrylate and/or methacrylate groups, more preferably acrylate groups.

Examples of suitable hydroxyl-containing compounds of component B) are 2-hydroxyethyl(meth)acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone)mono(meth)acrylates such as, Tone M100® for example, (Dow, Schwalbach, DE), 2-hydroxy-propyl(meth)acrylate, 4-hydroxybutyl(meth)acrylate, hydroxybutyl vinyl ether, 3-hydroxy-2,2-dimethylpropyl (meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol, dipentaerythritol.

Likewise suitable as a constituent of B) as well are alcohols obtained from the reaction of acids containing double bonds with epoxide compounds optionally containing double bonds, such as, for example, the reaction products of (meth)acrylic acid with glycidyl(meth)acrylate or bisphenol A diglycidyl ether.

Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl(meth)acrylate and glycidyl(meth)acrylate.

With particular preference the compounds of component B) correspond to the aforementioned kind and have an OH functionality of from 0.9 to 1.1.

Preference is given to the use of hydroxyethyl(meth)acrylate, hydroxypropyl(meth)acrylate and hydroxybutyl(meth)acrylate. Very particular preference is given to hydroxyethyl acrylate and hydroxypropyl acrylate.

Besides the OH-functional unsaturated compounds of component B) it is possible to use further compounds C) as well, which are different from those of B) and contain NCO-reactive groups such as OH, SH or NH, for example. These may be, for example, NH- or SH-functional compounds containing groups which react, with polymerization, with ethylenically unsaturated compounds on exposure to actinic radiation.

Compounds which are non-reactive under exposure to actinic ray's, such as polyether polyols, polyester polyols, polycarbonate polyols and polyhydric alcohols, for example, can also be used in addition to influence the product properties, as component C). As polyols it is possible to use hydroxyl compounds of relatively high molecular weight and, in minor amount, hydroxyl compounds of low molecular weight as well.

Hydroxyl compounds of relatively high molecular weight include the hydroxy polyesters, hydroxy polyethers, hydroxy polythioethers, hydroxy polyacetals, hydroxy polycarbonates, dimer fatty alcohols and/or esteramides that are customary in polyurethane chemistry, in each case with average molecular weights of 400 to 8 000 g/mol, preference being given to those having average molecular weights of 500 to 6 500 g/mol. Preferred hydroxyl compounds of relatively high molecular weight are hydroxy polyethers, hydroxy polyesters and hydroxy polycarbonates.

Low molecular weight polyhydroxyl compounds which can be used are polyols customary in polyurethane chemistry, having molecular weights of 62 to 399, such as ethylene glycol, triethylene glycol, tetraethylene glycol, propane-1,2-diol and -1,3-diol, butane-1,4-dial and -1,3-diol, hexane-1,6-diol, octane-1,8-diol, neopentyl glycol, 1,4-bis(hydroxymethyl)cyclohexane, bis(hydroxymethyl)tricyclo[$5.2.1.0^{2,6}$] decane or 1,4-bis(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol-butane-1,2,4-triol, pentaerythritol, quinitol, mannitol, sorbitol, methyl glycoside and 4,3,6-dianhydrohexitols.

Suitable polyether polyols are the polyethers customary in polyurethane chemistry, such as the addition compounds or mixed addition compounds, prepared using starter molecules with a valency of two to six such as water or the abovementioned polyols or amines containing 1- to 4-NH bonds, of tetrahydrofuran, styrene oxide, ethylene oxide, propylene oxide, the butylene oxides or epichlorohydrin, particularly those of ethylene oxide and/or of propylene oxide. Preference is given to propylene oxide polyethers which contain on average 2 to 4 hydroxyl groups and which can contain up to 50% by weight of incorporated polyethylene oxide units.

Examples of suitable polyester polyols include reaction products of polyhydric, preferably dihydric and optionally additionally trihydric alcohols with polybasic, preferably dibasic, carboxylic acids. In lieu of the free carboxylic acids it is also possible to use the corresponding polycarboxylic anhydrides or corresponding polycarboxylic esters of lower alcohols or mixtures thereof for preparing the polyesters. The polycarboxylic acids may be aliphatic, cycloaliphatic aromatic and/or heterocyclic in nature and may where appropriate be substituted, by halogen atoms for example, and/or unsaturated. By way of example mention is made of adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetra-hydrophthalic anhydride, maleic anhydride, maleic acid, fumaric acid, dimeric and trimeric fatty acids such as oleic acid, optionally in a mixture with monomeric fatty acids, dimethyl terephthalate or bis-glycol terephthalate. Preference is given to hydroxy polyesters which melt at below 60° C. and have 2 or 3 terminal OH groups.

The polycarbonate polyols that come under consideration are obtainable by reacting carbonic acid derivatives, e.g. diphenyl carbonate, dimethyl carbonate or phosgene, with diols. Examples of suitable such diols include ethylene glycol, triethylene glycol, tetraethylene glycol, propane-1,2-diol and -1,3-diol, butane-1,4-diol and -1,3-diol, pentane-1,5-diol, hexane-1,6-diol, octane-1,8-diol, neopentyl glycol, 1,4-bis(hydroxymethyl)cyclohexane, bis(hydroxymethyl)-tricyclo[$5.2.1.0^{2,6}$]decane or 1,4-bis(2-hydroxyethoxy)-benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A, or mixtures of said diols. The diol component preferably receives 40% to 100% by weight of hexanediol, preferably hexane-1,6-diol, and/or hexanediol derivatives, preferably those which in addition to terminal OH groups contain ether groups or ester groups, examples being products obtained by reacting 1 mol of hexanediol with at least 1 mol, preferably 1 to 2 mol, of caprolactone in accordance with DE-A 1 770 245, or by etherifying hexanediol with itself to give the di- or trihexylene glycol. The preparation of such derivatives is known for example from DE-A 1 570 540. The polyether-polycarbonate diols described in DE-A 3 717 060 can also be used to very good effect.

The hydroxypolycarbonates ought to be substantially linear. As a result of the incorporation of polyfunctional components, in particular polyols of low molecular weight, however, they may also, optionally, be slightly branched.

Examples of compounds suitable for this purpose include trimethylolpropane, hexane-1,2,6-triol, glycerol, butane-1,2,4-triol, pentaerythritol, quinitol, mannitol, sorbitol, methyl glycoside and 4,3,6-dianhydrohexitols.

Additionally it is possible to incorporate groups having a hydrophilicizing action, particularly if use from an aqueous medium is envisaged, such as in an aqueous coating material, for example. Groups with a hydrophilicizing action are ionic groups, which may be either cationic or anionic in nature, and/or nonionic hydrophilic groups. Cationically, anionically or nonionically dispersing compounds are those which contain, for example, sulphonium, ammonium, phosphonium, carboxylate, sulphonate or phosphonate groups or the groups which can be converted into the aforementioned groups by forming salts (potentially ionic groups) or which contain polyether groups and can be incorporated by means of existing isocyanate-reactive groups. Isocyanate-reactive groups of preferred suitability are hydroxyl and amino groups.

Examples of suitable compounds containing ionic or potentially ionic groups are mono- and dihydroxycarboxylic acids, mono- and diaminocarboxylic acids, mono- and dihydroxysuilphonic acids, mono- and diaminosulphonic acids and also mono- and dihydroxyphosphonic acids or mono- and diaminophosphonic acids and their salts, such as dimethylol propionic acid, dimethylolbutyric acid, hydroxypivalic acid, N-(2-aminoethyl)-β-alanine, 2-(2-aminoethylamino)ethanesulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulphite with but-2-ene-1,4-diol, polyethersulphonate, the propoxylated adduct of 2-butenediol and $NaHSO_3$, described for example in DE-A 2 446 440 (page 5-9, formula I-III) and also structural units which can be converted into cationic groups, such as N-methyldiethanolamine, as hydrophilic synthesis components. Preferred ionic or potential ionic compounds are those possessing carboxyl or carboxylate and/or sulphonate groups and/or ammonium groups.

Particularly preferred ionic compounds are those which contain carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A-0 916 647, Example 1) and also of dimethylolpropionic acid.

Suitable nonionically hydrophilicizing compounds are, for example, polyoxyalkylene ethers containing at least one hydroxyl or amino group. These polyethers include a fraction of from 30% to 100% by weight of units derived from ethylene oxide. Suitable compounds include polyethers of linear construction with a functionality of between 1 and 3, but also compounds of the general formula (I), in which

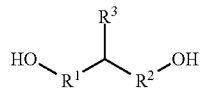

formula (I)

$R^1$ and $R^2$ independently of one another are each a divalent aliphatic, cycloaliphatic or aromatic radical having 1 to 18 carbon atoms, which may be interrupted by oxygen and/or nitrogen atoms, and $R^3$ is an alkoxy-terminated polyethylene oxide radical.

Nonionically hydrophilicizing compounds are, for example, also monohydric polyalkylene oxide polyether alcohols containing on average 5 to 70, preferably 7 to 55, ethylene oxide units per molecule, such as are obtainable in conventional manner by alkoxylating suitable starter molecules (e.g. in Ullmanns Encyclopadie der technischen Chemie, 4th edition, volume 19, Verlag Chemie, Weinheim pp. 31-38).

Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxylmethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole. Preferred starter molecules are saturated monoalcohols. Particular preference is given to using diethylene glycol monobutyl ether as starter molecule.

Alkylene oxides suitable for the alkoxylation reaction are, in particular, ethylene oxide and propylene oxide, which can be used in any order or in a mixture in the alkoxylation reaction.

The polyalkylene oxide polyether alcohols are either straight polyethylene oxide polyethers or mixed polyalkylene oxide polyethers at least 30 mol %, preferably at least 40 mol %, of whose alkylene oxide units are composed of ethylene oxide units. Preferred nonionic compounds are monofunctional mixed polyalkylene oxide polyethers which contain at least 40 mol % of ethylene oxide units and not more than 60 mol % of propylene oxide units.

Especially when using a hydrophilicizing agent containing ionic groups it is necessary to investigate its effect on the action of the catalysts D) and E). For this reason preference is given to nonionic compounds as hydrophilicizing agents.

Suitable compounds of the catalyst component D) include urethanization catalysts that are known per se to the skilled person, such as organotin compounds or aminic catalysts. Organotin compounds that may be mentioned by way of example include the following: dibutyltin diacetate, dibutyltin dilaurate, dibutyltin bis-acetoacetonate and tin carboxylates such as tin octoate, for example. The tin catalysts mentioned may optionally be used in combination with aminic catalysts such as aminosilanes or 1,4-diazabicyclo[2.2.2]octane.

With particular preference dibutyltin dilaurate is used as urethanization catalyst in D).

The catalyst D), if used at all, is employed in amounts of 0.001% to 5.0%, preferably 0.001% to 0.1% and more preferably 0.005% - to 0.05% by weight, based on solids content of the process product.

As catalyst E) it is possible to use allophanatization catalysts that are known per se to the skilled person, such as the zinc salts zinc octoate, zinc acetylacetonate and zinc 2-ethylcaproate, or tetraalkylammonium compounds, such as N,N, N-trimethyl-N-2-hydroxypropylammonium hydroxide, N,N, N-trimethyl-N-2-hydroxypropylammonium 2-ethylhexanoate or choline 2-ethylhexanoate. Preference is given to the use of the tetraalkylammonium compounds, more preferably that of tetraalkylammonium alkarioates and very preferably that of choline 2-ethylhexanoate as allophanatization catalyst.

The allophanatization catalyst is used in amounts of 0.001-5.0% by weight, preferably 0.01-1.0% by weight and more preferably 0.05-0.5% by weight based on solids content of the process product.

In principle it is possible to use the allophanatization catalyst E) even for the urethanization reaction in D) and to simplify the two-stage procedure into a one-stage reaction. However, this is not preferred, and so the allophanatization catalyst is not added until all or a proportion of the urethane groups are to be reacted to allophanate groups.

The catalyst E) can be added in a portion all at once or else in a number of portions or else continuously. Preference is given to portion wise or continuous addition, in order to avoid temperature peaks and consequent unwanted polymerization reactions of the radiation-curing groups. With particular preference the catalyst E) is added at a rate of 200-600 ppm/h and in order to complete the allophanatization the reaction mixture is stirred on until the desired NCO content of the end product is reached.

The reaction of allophanatization is preferably carried out until the NCO content of the product is below 0.5% by weight, more preferably below 0.1% by weight.

It is possible in principle to react a residual NCO group content with NCO-reactive compounds such as alcohols, for example, after the end of the allophanatization reaction. This gives products having an especially low NCO contents.

It is also possible to apply the catalysts D) and/or E) to support materials by methods known to the skilled person and to use them as heterogeneous catalysts.

It is possible to make use optionally at any desired point of solvents or reactive diluents.

Suitable solvents are inert towards the functional groups present in the process product from the time of their addition up to the end of the process. Suitable solvents are, for example, those used in the paint industry, such as hydrocarbons, ketones and esters, e.g. toluene, xylene, isooctane, acetone, butanone, methyl isobutyl ketone, ethyl acetate, butyl acetate, tetrahydrofuran, N-methyl-pyrrolidone, dimethylacetamide and dimethylformamide, though it is preferred not to add any solvent.

As reactive diluents it is possible to use compounds which in the course of UV curing are likewise (co)polymerized and hence incorporated into the polymer network and are inert towards NCO groups. Such reactive diluents are described exemplarily, by way of example, in P. K. T. Miring (Ed.), Chemistry & Technology of UV & EB Formulations For Coatings, Inks & Paints, Vol. 2, 1991, SITA Technology, London, pp. 237-285. They may be esters of acrylic acid or methacrylic acid, preferably of acrylic acid, with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclo-pentanol, arylaliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Preferred dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives.

The binders of the invention must be stabilized against premature polymerization. Therefore, as a constituent of component A) or B), before and/or during the reaction, stabilizers are added which inhibit the polymerization. Use is made in this context preferably of phenothiazine. Possible other stabilizers are phenols such as para-methoxyphenyl, 2,5-di-tert-butylhydroquinone or 2,6-di-tert-butyl-4-methylphenol. Also suitable are N-oxyl compounds for stabilization, such as 2,2,6,6-tetramethylpiperidine N-oxide (TEMPO), for example, or its derivatives. The stabilizers can also be incorporated chemically into the binder; suitability in this context is possessed by compounds of the abovementioned classes, especially if they still carry further free aliphatic alcohol groups or primary or secondary amine groups and hence can be attached chemically to compounds of component A) by way of urethane or urea groups. Particularly suitable for this purpose is 2,2,6,6-tetramethyl-4-hydroxypiperidine N-oxide.

Other stabilizers, such as compounds from the class of the HALS (HALS=hindered amine light stabilizers), in contrast, are used less preferably in E), since they are known not to enable such effective stabilization and instead may lead to "creeping" free-radical polymerization of unsaturated groups.

The stabilizers are to be chosen such that they are stable under the influence of the catalysts D) and E) and do not react with a component of the process of the invention under the reaction conditions. This can lead to a loss of the stabilizing property.

In order to stabilize the reaction mixture, in particular the unsaturated groups, against premature polymerization it is possible to pass an oxygen-containing gas, preferably air, into and/or over the reaction mixture. It is preferred for the gas to have a very low moisture content, in order to prevent unwanted reaction in the presence of isocyanate.

In general a stabilizer is added during the preparation of the binders of the invention, and at the end, in order to achieve a long-term stability, stabilization is repeated with a phenolic stabilizer, and optionally the reaction product is saturated with air.

The stabilizer component is used typically in amounts of 0.001% to 5.0% by weight, preferably 0.01% to 2.0% by weight and more preferably 0.05% to 1.0% by weight, based on the solids content of the process product.

The process is carried out at temperatures of not more than 100° C., preferably of 20 to 100° C., more preferably of 40 to 100° C., in particular at 60 to 90° C.

It is possible in principle to carry out the process of the invention in one stage, operating with a catalyst or a catalyst mixture that catalyses both the urethanization reaction and the allophanatization reaction. In that case urethanization and allophanatization are carried out in parallel. This procedure, though, is not preferred.

The soft allophanate unsaturated urethane(meth)acrylate polymer or oligomer, especially those based on the employed with preference, preferably have shear viscosities at 23° C. of ≤150 000 mPas, more preferably ≤80 000 mPas.

The soft allophanate unsaturated urethane(meth)acrylate polymer or oligomer, especially those based on the HDI used with preference, preferably have number-average molecular weights $M_n$ of 600 to 3000 g/mol, more preferably 650 to 1500 g/mol.

The soft allophanate unsaturated urethane(meth)acrylate polymer or oligomer preferably contain less than 0.5% by weight of free di- and/or triisocyanate monomers, more preferably less than 0.1% by weight.

In addition to components 1) and 2), the coating compositions according to the invention may also contain copolymerizable monomers, which also serve the function as a reactive diluent. The copolymerizable monomers are selected from organic compounds which contain at least one copolymerizable olefinic double bond, preferably 2 or more double bonds, and preferably have a viscosity of not more than 1000, more preferably not more than 500 mPa·s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylolpropane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The copolymerizable monomers may be present in amounts of up to 500% by weight, preferably up to 200% by weight and more preferably up to 50% by weight, based on the weight of components 1) and 2).

A variety of photoinitiators can be utilized in the radiation-curing compositions of the present invention. The usual photoinitiators are the type that generate free radicals when exposed to radiation energy. Illustrative of suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene; 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; and mixtures thereof. There are several suitable photoinitiators commercially available from Ciba including Irgacure® 184 (1-hydroxy-cyclohexyl-phenyl-ketone); Irgacure® 819 (bis(2,4,6-trimethylbenzoyl)-phenylphosphineoxide); Irgacure® 1850 (a 50/50 mixture of bis(2,6-dimethoxybenzoyl)-2,4,4-trimethylpentyl-phosphine oxide and 1-hydroxy-cyclohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1 [4-(methylthio)phenyl]-2-morpholonopropan-1-one); Darocur® MBF (a pheny glyoxylic acid methyl ester) and Darocur® 4265 (a 50/50 mixture of bis(2,4,6-trimethylbenzoyl)-phenylphosphine-oxide, Irgacure® 2022 (a mixture of Irgacure® 819 (phosphine oxide, phenyl bis(2,4,6-trimethyl benzoyl)) (20 wt %), and Darocure® 1173 (2-hydroxy-2-methyl-1-phenyl-1-propanone) (80 wt %)) and 2-hydroxy-2-methyl-1-phenyl-propan-1-one). The foregoing lists are meant to be illustrative only and are not meant to exclude any suitable photoinitiators known to those skilled in the art. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxy-pr-opane, and mixtures thereof.

The coating compositions may further comprise known additives. Examples of these additives include adhesion promoters, wetting agents, flow control agents, antiskinning agents, antifoaming agents, matting agents, (such as silica, aluminum silicates and high-boiling waxes), viscosity regulators, pigments (including both organic and inorganic pigments), dyes, UV absorbers and stabilizers against thermal and oxidative degradation.

The application of the coating compositions of the invention to the material to be coated takes place with the methods known and customary in coatings technology, such as spraying, knife coating, curtain coating, vacuum coating, rolling, pouring, dipping, spin coating, squeegeeing, brushing or squirting or by means of printing techniques such as screen, gravure, flexographic or offset printing and also by means of transfer methods.

Suitable substrates are, for example, wood, glass, metal, including in particular metal as used in the applications of wire enameling, coil coating, can coating or container coating, and also plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1), paper, leather, textiles, felt, wood materials, cork, inorganically bonded substrates such as wooden boards and fiber cement slabs, electronic assemblies or mineral substrates. It is also possible to coat substrates consisting of a variety of the abovementioned materials, or to coat already coated substrates such as vehicles, aircraft or boats and also parts thereof, especially vehicle bodies or parts for exterior mounting. It is also possible to apply the coating compositions to a substrate temporarily, then to cure them partly or fully and optionally to detach them again, in order to produce films, for example.

The coating compositions are especially suitable for glass substrates, in particular flat glass, glass panels and glass containers such as jars or bottles. Further, the coatings provide scuff resistance and durability which is required, especially during the bottle filling operations. The coated bottles also have good hand feel. The coatings can be applied with or without hot end coating, with or without cold end coating or both.

Preferably, the coatings are applied with an adhesion promoter pre-treatment of the glass. Suitable adhesion promoters are disclosed in U.S. Pat. No. 6,403,175, the entire contents of which are hereby incorporated by reference. Preferred adhesion promoters include, for example, γ-methacryloxypropyltrimethoxy silane, vinyltrimethoxy silane, and combinations thereof.

The coating compositions of the present invention provide design freedom to manufacture transparent, pigmented, high gloss, matte, and frosted looks on glass containers.

The coating compositions can be applied over a label (e.g. pressure-sensitive labels, UV-activated labels, heat transfer labels, etc.) or a decorative organic or inorganic coating or mixtures thereof which has previously been applied to the glass container. Labels (e.g. pressure-sensitive labels, UV-activated labels, heat transfer labels, etc.) can be applied over the organic coatings. The coatings also can be applied as a label.

The coating compositions are cured by using radiation sources such as ultraviolet (UV) and electron beam. The coating composition may be partially cured and dried by any suitable means known to those skilled in the art, such as air drying, thermal curing and accelerated drying by exposure to radiation, such as electromagnetic radiation, such as radio waves (RF), microwaves and infrared (IR) radiation and/or combinations thereof followed by curing with UV or electron beam.

EXAMPLES

Materials Used in the Examples:

Desmolux® XP 2683/1 (Hard Unsaturated aliphatic urethane acrylate having a Microhardness of 165 N/mm$^2$, Bayer MaterialScience LLC, Pittsburgh, Pa.).

Desmolux® XP 2491 (Soft Unsaturated aliphatic urethane acrylate having a Microhardness of <3 N/mm$^2$, Bayer MaterialScience LLC Pittsburgh, Pa.).

Desmolux® XP 2740 (Soft Unsaturated aliphatic allophanate urethane acrylate having a Microhardness of 27 N/mm$^2$, Bayer MaterialScience LLC, Pittsburgh, Pa.).

Irgacure® 2022 (photoinitiator available from BASF, Inc.).

Irgacure® 184 (photoinitiator available from BASF, Inc.).

Byk® 358 (polybutylacrylate, leveling aid available from Byk Chemie)

Chromacure 73-50194 (TMPTA BS Green pigment paste Plasticolors, Inc. Ashtabula, Ohio).

SR 506 (Isobornyl acrylate, Sartomer, LLC, Exton, Pa.).

Silquest® A-174 (γ-methacryloxypropyltrimethoxy silane, adhesion promoter, available from Momentive, Inc.).

Examples A-J

Application Details:

All formulations were prepared by mixing the acrylic polymer or oligomer together followed by the additives (photoinitiator, flow aid, pigment paste, solvent, reactive diluent) in the amounts shown in Table 1. The mixture was then thoroughly stirred.

Glass containers were coated for line simulation testing. Glass containers usually have cold end coating (CEC) applied on them. To remove CEC, 12 oz glass containers were placed into burnout oven and run through the burn cycle. This consists of a ramp up phase to a temperature of 900° F., maintaining this temperature for approximately 8 hours, followed by a cool down phase. (Burnout oven was used because of its convenience. Flame treatment was also tried and similar results were obtained.) Cooled glass containers were removed from the oven and handled only by the mouth of the bottle to prevent contamination of the bare glass by anything that may interfere with adhesion, such as oily fingerprints. Then, glass containers were dipped, one at a time, in a 1% Silquest A-174 in water solution to promote coating adhesion to the glass surface. Dipped glass containers were baked at 100° C. for 20 minutes. The mouth of the prepared glass container was slipped over a shaft attached to an air-driven motor. The bottle was spray coated with the prepared formulation as it rotated at 180 rev/minute. On average, 1.5 grams of coating was applied per glass container.

Testing Details:

Coatings for Fischer Microindenter evaluation were prepared by applying 80 μL of formulations onto glass disks using an Eppendorf pipettor and spread over the disks using the tip of the disposable tip. For this particular test the formulation was let stand for approximately 30 minutes in ambient conditions and then UV cured.

All the tests were performed 24 hours after the coatings were cured. The coatings were cured with Fusion UV equipment under Ga and Hg lamps at 10 feet/minute.

Microindenter readings (Marten's hardness) were done using Fischerscope® H100C instrument on glass disks. Microhardness readings were taken under a 30 mN test load run to a maximum of 5 μm indentation depth over a 20 second application time. Results were reported as an average of 3 readings for each formulation.

Coatings for scribe adhesion test were prepared by applying the formulations onto the airside of 6"×3" glass panel using a Number 50 wire wound rod. Scribe adhesion was done on silane pretreated glass panels after the films have been cured. Two one inch long scribes diagonal to each other were cut using a utility knife and pressed with adhesive 3M 898 tape across the cut then quickly peeled away. If no film peeled from the substrate, the coating was marked as "pass."

Line simulation testing was done as follows. Coated bottles were tested for durability of coating using an AGR Line Simulator equipped with variable speed. A total of 27 twelve oz bottles were placed in the Line Simulator, 7 of them coated with one formulation plus 20 "dummy" or uncoated bottles. The coated bottles were placed side by side in the simulator with the dummy bottles filling in the remainder of the bottle line, such that dummy bottles "flanked" the coated bottle group on both sides. The motor speed was set at 5 (35 rpm) and the tension gate was adjusted to simulate a line speed of 640 bottles/min. Coated bottles were empty and dummy bottles were filled with water; water was run over the bottle shoulders during the test procedure. The Line Simulator was set to run for 1 minute. After the Simulator stopped, the coated bottles were examined for any scuffing or coating breakthrough. This was repeated for a total of 5 times. After these 5 trials, if there was no coating breakthrough on any of the middle three coated bottles, the timer on the Line Simulator was set for 5 minutes and the bottles were run for 5 consecutive minutes before being examined again. More 5 minute intervals were run until coating breakthrough was seen on any of the 3 middle coated bottles. Results were reported as minutes passed before there was coating breakthrough on any of the 3 innermost bottles. Line Simulator tests were not done for Examples H and J.

TABLE 1

Amount of ingredients for the formulations. As used herein, the components in the formulations are measured in grams weight.

| | Formulation | | | | | | | | | |
|---|---|---|---|---|---|---|---|---|---|---|
| | A | B | C | D | E | F | G | H | I | J |
| Urethane Acrylate (Desmolux XP 2683/1) | 268.49 | 255.12 | 228.36 | 201.58 | 255.12 | 228.36 | 201.58 | 0.00 | 0.00 | 187.94 |
| Urethane Acrylate (Desmolux XP 2491) | 0.00 | 13.43 | 40.30 | 67.19 | 0.00 | 0.00 | 0.00 | 268.49 | 0.00 | 0.00 |
| Allophanate Urethane Acrylate (Desmolux XP 2740) | 0.00 | 0.00 | 0.00 | 0.00 | 13.43 | 40.30 | 67.19 | 0.00 | 268.49 | 80.55 |
| Irgacure 2022 | 8.05 | 8.05 | 8.05 | 8.05 | 8.05 | 8.05 | 8.05 | 8.05 | 8.05 | 8.05 |
| Byk 358 | 1.68 | 1.68 | 1.68 | 1.68 | 1.68 | 1.68 | 1.68 | 1.68 | 1.68 | 1.68 |
| Irgacure 184 | 3.36 | 3.36 | 3.36 | 3.36 | 3.36 | 3.36 | 3.36 | 3.36 | 3.36 | 3.36 |
| Chromacure 73-50194 | 3.36 | 3.36 | 3.36 | 3.36 | 3.36 | 3.36 | 3.36 | 3.36 | 3.36 | 3.36 |
| Butyl Acetate | 115.07 | 115.07 | 115.07 | 115.07 | 115.07 | 115.07 | 115.07 | 115.07 | 115.07 | 0.00 |
| SR 506 (IBOA reactive diluent) | 0.00 | 0.00 | 0.00 | 0.00 | 0.00 | 0.00 | 0.00 | 0.00 | 0.00 | 115.07 |
| Properties | | | | | | | | | | |
| Ratio of Hard/Soft resins | 100/0 | 95/5 | 85/15 | 75/25 | 95/5 | 85/15 | 75/25 | 0/100 | 0/100 | 70/30 |
| Microhardness (N/mm$^2$) | 165 | 133 | 58 | 46 | 158 | 122 | 112 | 0 | 27 | 139 |
| Scribe Adhesion | Pass | Pass | Pass | Pass | Pass | Pass | Pass | Pass | Pass | Pass |
| Line Simulation Pass (minutes) | 5 | 5 | 5 | 5 | 10 | 15 | 5 | — | 1 | — |

Formulation Results:

Example A is a hard aliphatic urethane acrylate. Examples B, C, and D have 5, 15, and 25% soft urethane acrylate added respectively. The microhardness of the coatings decrease as the amount of soft urethane acrylate is increased. However, line simulation results show no change with the soft of flexible urethane acrylate. Examples, E, F, G have 5, 15, and 25% soft allophanate urethane acrylate added respectively. The microhardness of the coatings decrease with increased amount of allophanate urethane acrylate. On the other hand, line simulation results show dramatic improvement with the addition of soft allophanate urethane acrylate. Soft allophanate urethane acrylate by itself does not pass more than one minute of line simulation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-aqueous coating composition comprising:
   1) 75 to 99 wt. % of a hard unsaturated urethane(meth) acrylate polymer or oligomer; and
   2) 1 to 25 wt. % of a soft unsaturated urethane(meth) acrylate polymer or oligomer containing allophanate groups;
   wherein the total wt. % of components 1) and 2) add up to 100%.

2. The coating composition of claim 1 comprising 85 to 95 wt. % of component 1) and 5 to 15 wt. % of component 2).

3. The composition of claim 1, further comprising 3) up to 500% by weight based on the total weight of components 1) and 2), of solvent(s) or a copolymerizable monomer(s) that does not contain urethane groups as reactive diluents.

4. A glass substrate coated with the non-aqueous coating composition of claim 1.

5. The coating composition of claim 1, wherein component 1) is prepared by reacting
   i) one or more organic polyisocyanates, and
   ii) one or more —NH or —OH functional compounds, and
   iii) 1) from 0 to about 100% by weight, of a mono-, di-, tri- or poly-hydroxyl-$C_1$-$C_{10}$-aikyl or $C_6$-$C_{10}$-aryl (meth) acrylate;
      2) from 0 to 100% by weight of an unsaturated (meth) acrylate polyol based on a compound selected from the group consisting of polyesters, polyethers, polythioethers, polyacetals, polycarbonates, dimer fatty alcohols and/or esteramides, in each case with number average molecular weights of from 400 to 8000 g/mol; or
      3) the combination of iii) 1) and ii) 2), wherein the percents by weight of components iii) 1), iii) 2) are based on the total weight of components iii)1]) and iii)2) and total 100%,
   at an isocyanate to hydroxyl equivalent ratio of from about 0.9:1 to about 1:0.9.

6. The coating composition of claim 1, wherein component 1) is prepared by reacting
   i) one or more organic polyisocyanates, and
   ii) one or more —NH or —OH functional compounds having a number average molecular weight of from about 60 to about 600, and
   iii) 1) from 0 to about 100% by weight, of a mono-, di-, tri- or poly-hydroxyl-$C_1$-$C_{10}$-alkyl or $C_6$-$C_{10}$-aryl(meth) acrylate;
      2) from 0 to 100% by weight of an unsaturated (meth) acrylate polyol based on a compound selected from the group consisting of polyesters, polyethers, polythioethers, polyacetals, polycarbonates, dimer fatty alcohols and/or esteramides, in each case with number average molecular weights of from 400 to 8 000 g/mol; or
      3) the combination of iii) 1) and ii) 2), wherein the percents by weight of components iii)1), iii)2) are based on the total weight of components iii)1) and iii)2) and total 100%,
   at an isocyanate to hydroxyl equivalent ratio of from about 0.9:1 to about 1:0.9.

7. The coating composition of claim 6, wherein component i) is selected from the group consisting of butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl)methanes ($H_{12}$MDI), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4"-triisocyanate and mixtures thereof, their derivatives having a urethane, isocyanurate, allophanate, biuret, uretdione, iminooxadiazinedione structure and mixtures thereof.

8. The coating composition of claim 6, wherein component ii) is selected from the group consisting of ethylene glycol; diethylene glycol; triethylene glycol; propylene glycol; dipropylene glycol; butane diols; hexane diols; glycerin; trimethylolethane; trimethylolpropane; pentaerythritol; hexane triols; mannitol; sorbitol; glucose; fructose; mannose; sucrose; propoxylated and/or ethoxylated adducts of any of the above-noted hydroxy functional materials having number average molecular weights of up to about 600; ethylene diamine; 1,2-diaminopropane; 1,4-diaminobutane; 1,6-diaminohexane; 2,5-dimethylhexane; 2,2,4-and/or 2,4,4-trimethyl-1,6-diaminohexane; 1,11-diaminoundecane; 1,12-diaminododecane; 1-amino-3,3,5-trimethyl-5-aminomethylcyclohexane; 2,4- and/or 2,6-hexahydrotoluylene diamine; 2,4'- and/or 4,4'-diamino-dicyclohexyl methane; 3,3'-dimethyl-4,4'-diamino-dicyclohexyl methane; 2,4-and/or 2,6-diaminotoluene and 2,4'- and/or 4,4'-diaminodiphenyl methane.

9. The coating composition of claim 1, wherein component 2) has a residual monomer content of less than 0.5% by weight and an NCO content of less than 1% by weight, and is prepared by reacting
   A) compounds containing isocyanate groups,
   B) hydroxy-functional compounds which contain groups which react, with polymerization, with ethylenically unsaturated compounds on exposure to actinic radiation (radiation-curing groups) and
   C) optionally further compounds containing NCO-reactive groups
   D) optionally in the presence of a catalyst are used to form NCO-group-containing urethanes having radiation-curing groups, which are subsequently reacted, without further addition of compounds containing isocyanate groups, in the presence of
   E) an allophanatization catalyst, the ratio of NCO groups of the compounds from A) to the OH groups of the compounds from B) and, where used, C) being 1.45:1.0 to 1.1:1.0.

10. The composition of claim 9, wherein component A) is selected from the group consisting of 2,4-/2,6-toluene diisocyanate (TDI), methylenediphenyl diisocyanate (MDI), triisocyanatononane (TIN), naphthyl diisocyanate (NDI), 4,4'-diisocyanatodicyclohexylmethane, 3-isocyanatomethyl-3,3,5-trimethylcyclohexyl isocyanate(isophorone diisocyanate=IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclohexyl)propane, 3-isocyanatomethyl-1-methyl-1-isocyanato-cyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI), polyisocyanates containing uretdione or isocyanurate groups, isocyanate-terminated prepolymers and mixtures thereof.

11. The composition of claim 9, wherein component B) is selected from the group consisting of 2-hydroxyethyl(meth)acrylate, polyethylene oxide mono(meth)acrylate, polypropylene oxide mono(meth)acrylate, polyalkylene oxide mono(meth)acrylate, poly(ε-caprolactone)mono(meth)acrylates, 2-hydroxypropyl(meth)acrylate, 4-hydroxybutyl(meth)acrylate, hydroxybutyl vinyl ether, 3-hydroxy-2,2-dimethylpropyl(meth)acrylate, glyceryl di(meth)acrylate, trimethylolpropane di(meth)acrylate, pentaerythritol tri(meth)acrylate or dipentaerythritol penta(meth)acrylate.

12. The composition of claim 9, wherein component C) is selected from the group consisting of hydroxy polyethers, hydroxy polyesters, hydroxy polycarbonates and mixtures thereof.

13. The glass substrate of claim 12, wherein the coating composition has an appearance selected, from the group consisting of transparent, pigmented, high gloss, matte, and frosted.

14. The method of claim 13, wherein the actinic radiation is electron beam radiation.

15. The method of claim 13, further comprising prior to, or simultaneous with step 1), pre-treating the glass substrate with an adhesion promoter.

16. A glass bottle coated with the non-aqueous coating composition of claim 1.

17. The method of claim 16, wherein the actinic radiation is UV radiation.

18. A method of coating a glass substrate comprising:
 1) applying the non-aqueous coating composition of claim 1 to at least a portion of a glass substrate; and
 2) exposing the coating composition to a source of actinic radiation.

* * * * *